United States Patent [19]

Lindholm

[11] 4,009,389

[45] Feb. 22, 1977

[54] APPARATUS FOR THE AUTOMATIC COUNTING OF PASSENGERS

[75] Inventor: Ulf Lindholm, Trangsund, Sweden

[73] Assignee: Aktiebolaget Almex, Stockholm, Sweden

[22] Filed: Sept. 19, 1975

[21] Appl. No.: 614,865

[30] Foreign Application Priority Data

Sept. 26, 1974 Sweden ........................ 7412121

[52] U.S. Cl. ........................ 250/221; 340/258 B

[51] Int. Cl.[2] ........................ G01D 21/04

[58] Field of Search ........................ 250/221, 222; 340/258 B; 343/5 PD

[56] References Cited

UNITED STATES PATENTS

| | | | |
|---|---|---|---|
| 2,037,190 | 4/1936 | Backer | 250/221 |
| 2,047,665 | 7/1936 | Beggs | 250/221 |
| 2,065,048 | 12/1936 | Burnside | 250/221 |
| 2,082,941 | 6/1937 | Burnside | 250/221 |
| 3,207,266 | 9/1965 | Hornung | 250/221 |
| 3,764,813 | 10/1973 | Clement et al. | 250/221 |
| 3,842,257 | 10/1974 | Kohler | 340/258 B |
| 3,932,746 | 1/1976 | Swanson | 250/221 |

*Primary Examiner*—David C. Nelms
*Attorney, Agent, or Firm*—Hammond & Littell

[57] ABSTRACT

There is provided apparatus for determining the number of passengers entering and/or leaving a collective passenger vehicle. The apparatus comprises means for projecting a pair of light-beams of invisible light across the passageway of said passengers and means for receiving said light-beams. Detecting means which operate in conjunction with the light-beam receiving means are adapted to detect the energized or unenergized state of the receiving means and in response thereto to feed information to a data registering or recording means, said information being indicative of the number of passengers passing through the light-beams.

10 Claims, 4 Drawing Figures

APPARATUS FOR THE AUTOMATIC COUNTING OF PASSENGERS

FIELD OF THE INVENTION

The present invention relates to apparatus for counting automatically the number of passengers entering and/or leaving collective passenger vehicles, such as buses.

BACKGROUND OF THE INVENTION

A count of the number of people using public transport vehicles, is desirable, inter alia, so that persons responsible for the organisation of such vehicles can forecast the number of vehicles required to satisfy demand at different periods throughout the day.

In order to be deemed suitable in practise, the apparatus used for counting the number of people using public passenger vehicles must fulfill a number of requirements. One such requirement is that the apparatus must be readily adaptable to different types of buses for example, without requiring excessive assembly work or structural, alterations thereto. The apparatus should be constructed to count passengers whilst they enter and leave the vehicle through the doors thereof. The number of persons entering and leaving the vehicle should both be determined, so that the number of passengers entering and leaving said vehicle between predetermined stopping places along the route of the vehicle can be established. Such an apparatus comprises sensing devices arranged adjacent vehicle doors. As before mentioned, the doors should not have a width such that two passengers may pass therethrough simultaneously side by side. The doors of the majority of buses are already constructed for this purpose. The doors of public passenger vehicles, hereinafter referred to for convenience as buses, whose doors permit the entrance or departure of two or more passengers simultaneously should be provided with a centre partition to prevent this.

In the case of buses provided with two doors, one of which is specifically intended for passenger entrance and the other for passenger departure, it can not reliably be ensured that passengers will enter or leave the bus through the door intended. This is particularly true in passenger peak periods, when passengers are liable to depart from the bus through a door intended for the entrance of a passenger, even through the use of such a door for departure purposes is expressly forbidden. Consequently the passenger-sensing devices must be adapted so that they can sense whether a person is entering the bus or leaving said bus, i.e., they must be adapted to sense in both directions at each door. This requires the provision of two sensing devices for each door.

OBJECTS OF THE INVENTION

One object of the invention is to provide improved apparatus for the aforementioned purpose. Another object of the invention is to provide apparatus of the kind referred to which will have a minimal consumption of electric energy.

Accordingly, the present invention consists in an apparatus for automatically counting the number of persons entering and/or leaving a public passenger vehicle through a door-opening constructed as to permit the passage therethrough of only one passenger at a time, wherein said apparatus comprises means for producing a pair of beams of invisible light extending across said opening and spaced apart in a horizontal plane, individual means for receiving each of said light-beams and detecting means effective to detect the state of said light-beam receiving means and, in response to said state, to cause the registration of information indicative of the number of passengers passing through said door-opening.

So that the invention will be more readily understood and further features thereof made apparent, an embodiment of the invention will now be described with reference to the accompanying drawings, in which.

Figure 1:
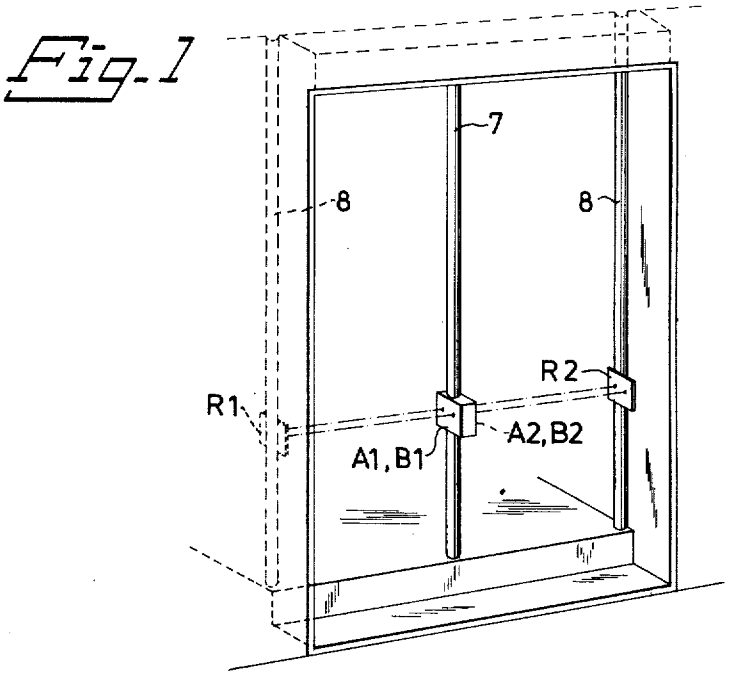
FIG. 1 shows diagrammatically a bus entrance or exit comprising double doors and provided with the apparatus according to the invention.
Figure 3:
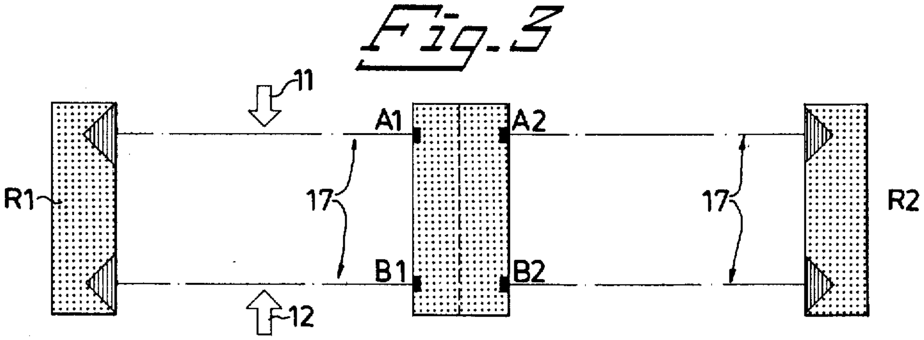
FIG. 3 shows diagrammatically and in plan view the positioning of light-beam transmitters and receivers and reflectors in a double door of a bus.

FIG. 1 shows diagrammatically the double door of a public passenger transport vehicle, such as a bus. In the door opening there is provided a centre bar 7 and two side bars 8. Arranged on either side of the centre bar is a pair of sensing devices A1 – B1 and A2 – B2 respectively. Mounted on each side bar is a reflector R1 and R2 respectively which are adapted to cooperate with the respective pairs of sensing devices. Each sensing device A1, A2, B1, B2 comprises a transmitter and a receiver for invisible infra-red radiation having a wave length of approximately 0.9 $\mu$m. The light-beams passing between the pairs of sensing devices and the reflectors is shown at 17 (FIG. 3). The light-beams are pulsated and are reflected by the associated reflector to the associated receivers. The light-beams are pulsated so as to eliminate the influence of ambient light. FIG. 3 is a top plan view showing diagrammatically the positioning of the sensing devices A1, A2, B1, B2 and the reflectors R1, R2. The arrows 11 and 12 indicate the directions of entry and departure respectively of a passenger through the door.

The sensing devices A1, B1 etc., within each pair of sensing devices are positioned on the same level so that it is possible to determine the direction in which a passenger moves when he passes through the door (entry into or departure from the vehicle) and are spaced apart in the horizontal plane by a distance of 8 – 12 cms., which is less than the thickness of an adult. Such positioning of the sensing devices enables two passengers following each other to be separately counted by the sensing devices. The sensing devices should be positioned at a height of 1.10 meters from the surface trodden by the passengers as they pass the sensing devices. Such a height is normally equivalent to the hip level of an adult passenger, this position being suitable since the hips are that portion of a person which moves least as he or she passes through the door. Small children whose height is less than the aforementioned distance are less important from the aspect of counting the number of passengers using the vehicle. The sensing devices may conveniently be placed above the edge of the step via which entry into the bus car be made. The reflectors may be placed obliquely both in a vertical and horizontal direction relative to the associated light-beam transmitter and receiver device. The distance between a sensing device and its associated reflector is suitably 50 – 90 cms. It is preferred for each emitter-receiver pair to be housed in a single box, and for the reflector employed therewith to be divided into two reflecting surfaces.

The door opening and closing mechanism of a bus is used in conjunction with electronic circuitry coupled in parallel with respective doors so as to control the transmitters of respective sensing devices, so that said transmitters are activated only when the doors are opened. In this way, the useful life of the transmitters is extended and false information created by a closed door is prevented. The electrical energy required for operating the apparatus can be taken from the vehicle battery.

Figure 2:
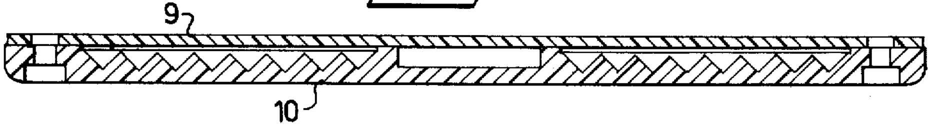
FIG. 2 shows a reflector adapted to cooperate with the light-beam transmitting and receiving devices used in said apparatus.

FIG. 2 shows diagrammatically a reflector which comprises a prismatically waved mirror surface 10 and a protective plate 9 arranged thereon. The plate 9 comprises a synthetic resin material which will permit only the invisible radiation to pass therethrough. The sensing devices are covered with corresponding protective plates.

Figure 4:
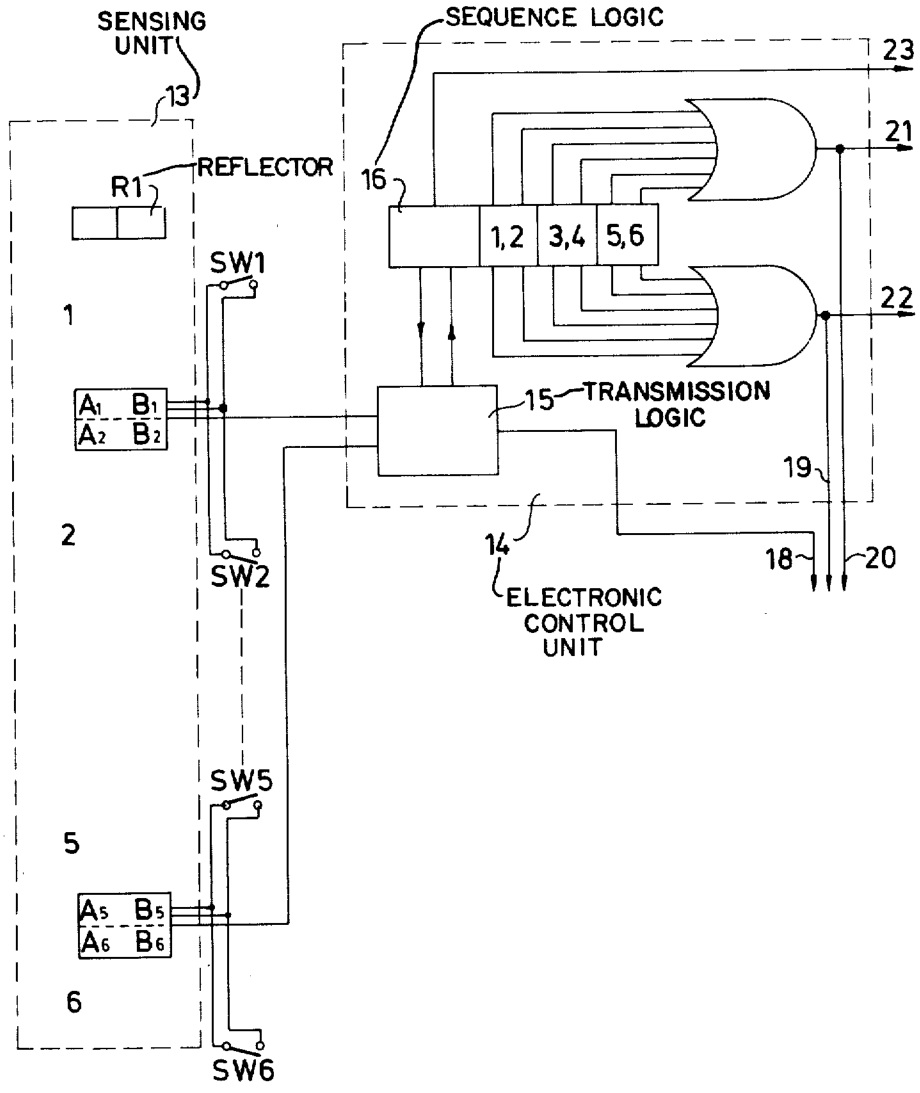
FIG. 4 is a circuit diagram for an automatic passenger counting apparatus according to the invention.

FIG. 4 is a block diagram of the automatic passenger counting apparatus according to the invention. The reference numerals 1, 2, 5, 6 indicate four door openings, while references SW1, SW2, SW5, SW6 indicate corresponding door-opening and-closing switches. The references A1, B1 and A2, B2 and A5, B5 and A6, B6 indicate sensing device pairs for the respective door openings. It has been assumed that the door openings are fitted with double doors, so that the switch pairs SW1-2 and SW5-6 respectively control the sensing devices for the door pairs 1 – 2 and 5 – 6 respectively. The sensing devices are incorporated in a sensing unit 13 (shown to the left of the figure) and are connected to an electronic control unit 14 (shown to the right of the figure). The electronic control unit 14 has an output 18 relating to data-to/from, and output 19 for data relating to departing passengers and an output 20 for data relating to incoming passengers. These outputs are connected over a common interface logic to further equipment, such as a tape recorder, radio etc. The data obtained via the doors when energised can be obtained in parallel via interface logic.

The unit 14 is also provided with two further data outputs, namely an output 21 for incoming passengers and an output 22 for outgoing passengers. The data is obtained in series with one pulse per person and direction i.e. entrance or departure of the passenger, and can readily be adapted to further electronic circuits. The unit 14 is constructed of printed circuit cards and comprises a common transmission logic circuit 15 and a sequence logic circuit for each door opening (1 – 2, 3 – 4 and 5 – 6 respectively in the block 16). Integrated CMOS-circuits are suitably used to maintain the current consumption, power losses and interference disturbances at a minimum. The outputs of the unit 14 may be connected to both digital-casette tape recorders and to radio equipment via interface logic for the wireless data transmission to a stationary data central.

The sensing of passengers passing through the doors takes place at one door at a time over a short period of time. The pulse frequency of the infra-red radiation is of the order of magnitude of 1.25 kHz and the sensing time per door of the order of magnitude of 1.6 ms. The sensing frequency is approximately 1 door per 10 ms. Consequently two persons can never be counted as one person, and even if two or more persons pass through the sensors of different doors at exactly the same time a separate counting pulse for each person is received. The apparatus is adapted so that a passing object having a speed beneath a specific value is registered.

The data obtained via each door is processed continuously in a sequence logic section 16 and is stored in sequence together with bus information, time information and bus-stop information, in a register for transmission to a data collector or radio. This register is cleared when all doors are closed.

The sequence logic section is required since the speed at which a person moves may vary from a stationary position to a relatively high speed either forwards or backwards. The sequence logic section 16 is coupled to a warning signal output 23. A signal is applied to the warning signal output 23 when one of the sensing devices ceases to function, for example if a sensing device remains permanently covered. This signal is used to ignite a light signal in the driver's cabin.

I claim:

1. Apparatus for automatically counting persons entering and leaving a public transportation vehicle having at least two passenger doorways provided with doors, each doorway being the width of an adult person and each doorway being adapted for entry and egress of passengers, comprising: per doorway, two emitters of invisible light adapted to emit a pair of pulsed parallel beams of said light in a horizontal plane across said doorway, the distance between said parallel beams being less than the thickness of an adult person, said plane being about the height of the hip of an adult in said doorway; two beam sensors of said light, each adapted to sense an interruption in said pulsed invisible light beam transmitted thereto; a reflector of invisible light positioned across said doorway opposite said emitters and adapted to reflect one of said beams to one of said sensors and to reflect the other beam to the other sensor, said sensors being visible from said reflector; electronic means cooperating with each of said sensors to emit a pulse of electric current for each interruption of the pulsed invisible light beam thereto; electronic pulse sensing means adapted to receive the pulses emitted from each of said sensors and to distinguish between and to separately register pulse pairs produced by interruption of the first beam of said pair of beams before interruption of the second beam of said pair and between pulse pairs produced by interruption of the second beam of a pair of beams before interruption of the first beam of said pair, thereby distinguishing between pulse pairs produced by persons passing inwardly through the doorway and pulse pairs produced by persons passing outwardly through said doorway; means for separately registering and storing said inward and said outward pulses separately for each doorway of said vehicle; and switch means cooperating with said doors to supply electric current to said apparatus only when said doors are open.

2. Apparatus according to claim 1 characterised in that the pulse sensors are adapted to sense at a frequency of approximately 10 ms.

3. Apparatus according to claim 1 characterised in that each of said pulse sensors is adapted to be energized for approximately 1.6 ms. in synchronism with said sensor means.

4. Apparatus according to claim 1 characterised in that the wave length of the invisible light which the emitters are adapted to emit is 0.9 $\mu$m.

5. Apparatus according to claim 1 characterised in that for each door, said electronic means comprises a sequence logic section and a common transmission logic section is arranged for all the doors.

6. Apparatus according to claim 5, characterised in that the sequence logic section is adapted to continuously process data from each door and to sequentially store such data together with vehicle identification information, time information and vehicle stop place information in a register provided with means for transmitting said data to a data collecting station.

7. Apparatus according to claim 1 characterised in that each pair of emitter-receivers is housed in a single box and the reflector employed therewith is divided into two reflecting surfaces.

8. Apparatus according to claim 1 wherein said reflector is not reflective to visible light.

9. Apparatus according to claim 1 wherein said sensors do not sense visible light.

10. Apparatus according to claim 1 wherein said electric current is supplied from a storage battery in said vehicle.

* * * * *